(12) United States Patent
Lee et al.

(10) Patent No.: US 7,362,691 B2
(45) Date of Patent: Apr. 22, 2008

(54) OPTICAL DISC HAVING TRACKING POLARITY INFORMATION, AND APPARATUSES AND METHODS FOR RECORDING AND REPRODUCING USER DATA ON THE SAME

(75) Inventors: Kyung-geun Lee, Gyeonggi-do (KR); In-sik Park, Gyeonggi-do (KR); Jung-wan Ko, Cycongi-do (KR); Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 10/695,393

(22) Filed: Oct. 29, 2003

(65) Prior Publication Data

US 2004/0085877 A1 May 6, 2004

(30) Foreign Application Priority Data

Nov. 4, 2002 (KR) .................... 10-2002-0067968

(51) Int. Cl.
*G11B 7/00* (2006.01)
(52) U.S. Cl. ............................... 369/275.1; 369/44.11; 369/52.1
(58) Field of Classification Search ............. 369/275.1, 369/52.1, 44.11
See application file for complete search history.

(56) References Cited

U.S. PATENT DOCUMENTS 6,295,262 B1* 9/2001 Kusumoto et al. ....... 369/53.37
6,819,643 B2* 11/2004 Kobayashi et al. ...... 369/53.21
6,894,962 B1* 5/2005 Nishiuchi et al. ........ 369/47.51
2001/0008578 A1* 7/2001 Otomo et al. .................. 386/98
2002/0003757 A1* 1/2002 Uhde et al. .............. 369/44.29
2003/0016603 A1  1/2003 Tomita
2003/0076775 A1  4/2003 Sato et al.
2003/0202436 A1* 10/2003 Tomita et al. ........... 369/44.26
2003/0219124 A1* 11/2003 Selinfreund et al. ........ 380/201
2005/0099916 A1* 5/2005 Jeon et al. ............... 369/47.54
2005/0238333 A1  10/2005 Ueda et al.

FOREIGN PATENT DOCUMENTS

CN           1304137         7/2001

(Continued)

OTHER PUBLICATIONS

Patent Abstract for PCT Publication No. WO 02/37483, published May 10, 2002.
Office Action issued in Chinese Patent Application No. 200380102288.3 on Apr. 21, 2006.

(Continued)

*Primary Examiner*—Wayne Young
*Assistant Examiner*—LaTanya Bibbins
(74) *Attorney, Agent, or Firm*—Stein, McEwen & Bui, LLP (57) ABSTRACT

An optical disc includes tracking polarity information. The optical disc includes a clamping area, a lead-in area, a data area, and a burst cutting area (BCA). The BCA is present between the clamping area and the lead-in area and in which information regarding the optical disc is recorded, and the information is read before performing tracking in the data area. Accordingly, it is possible to obtain the tracking polarity information and/or reflectivity information without trial and error and directly record or reproduce user data in a data area of the optical disc.

11 Claims, 5 Drawing Sheets

FOREIGN PATENT DOCUMENTS

| | | |
|---|---|---|
| CN | 1592930 | 3/2005 |
| JP | 2000-200422 | 7/2000 |
| JP | 2002-93059 | 3/2002 |
| KR | 2001-47957 | 8/2001 |
| KR | 2003-13774 | 2/2003 |
| KR | 2004-33433 | 4/2004 |
| WO | WO 02/37483 | 4/2003 |

OTHER PUBLICATIONS

Office Action issued in Korean Patent Application No. 2002-67968 on Nov. 20, 2006.

U.S. Appl. No. 11/542,134, filed Oct. 2006, Kyung-geun Lee et al., Samsung Electronics Co., Ltd.

* cited by examiner

OPTICAL DISC HAVING TRACKING POLARITY INFORMATION, AND APPARATUSES AND METHODS FOR RECORDING AND REPRODUCING USER DATA ON THE SAME

CROSS-REFERENCE TO RELATED APPLICATIONS

This application claims the priority of Korean Patent Application No. 2002-67968 filed Nov. 4, 2002, in the Korean Intellectual Property Office, the disclosure of which is incorporated herein in its entirety by reference.

BACKGROUND OF THE INVENTION

1. Field of the Invention

The present invention relates to an optical disc, and more particularly, to an optical disc having at least one recording layer, and apparatuses and methods for recording and reproducing data on the same.

2. Description of the Related Art

Compact discs (CDs) and digital versatile discs (DVDs) are the most popular types of data storage media. In general, user data is recorded on pits of a recording layer of a read-only optical disc and recorded by changing a phase of a phase change material (PCM) on the recording layer of a rewritable optical disc which is covered with the PCM.

A pickup, which is included in an optical disc reproducing apparatus, detects a precise position of a track in which the user data is recorded, receives a laser beam reflected from the track, and reads the user data from the laser beam. A signal that the pickup uses to detect a position of a desired track is called a tracking signal. The tracking signal is obtained when a photo diode, which has a plurality of light receiving parts, receives the laser beam. Signals are generated from lights received by the respective light receiving parts, and then, the signals are added together or subtracted from each other. The tracking signal curves like an S-shape and right and left sides of the tracking signal, which are divided with respect to a central point of the tracking signal, have opposite polarities.

The polarities of the tracking signal change according to a type of the optical disc or physical characteristics of the recording layer on the optical disc, such as the physical characteristics of the pit or the track. In other words, the polarities of the tracking signal change from (−) to (+) and from (+) to (−) according to the type of optical disc or the physical characteristics of the recording layer. Therefore, when the optical disc is loaded into a conventional optical disc reproducing apparatus, the apparatus determines the polarity of a tracking signal by trial and error, detects the position of the track in which the user data is recorded based on the polarity, and reads the user data from the track. That is, the conventional optical disc reproducing apparatus spends considerable time in detecting the polarity of the tracking signal before reading the user data, thereby delaying a reproduction of the user data.

Meanwhile, a reflectivity of the optical disc is a ratio of a power of the laser beam reflected from the recording layer of the optical disc to the power of the laser beam incident on the recording layer. The reflectivity also depends on the type of optical disc or the physical characteristics of the recording layer, and therefore, the conventional optical disc reproducing apparatus detects the reflectivity by trial and error.

SUMMARY OF THE INVENTION

The present invention provides an optical disc from which information regarding a polarity of a tracking signal and/or a reflectivity is easily recognized, and apparatuses and methods for recording and reproducing information on the same.

Additional aspects and/or advantages of the invention will be set forth in part in the description which follows and, in part, will be obvious from the description, or may be learned by practice of the invention.

According to an aspect of the present invention, there is provided an optical disc including a clamping area; a lead-in area; a data area; and a burst cutting area (BCA) which is present between the clamping area and the lead-in area and in which information regarding the optical disc is recorded, wherein the information is read before performing tracking in the data area.

According to an aspect of the present invention, the information regarding the optical disc is at least one of tracking polarity information and reflectivity information, and the tracking polarity information and the reflectivity information are recorded with a pattern of crystalline or non-crystalline marks.

According to an aspect of the present invention, the recording of the tracking polarity information begins at leading bytes in the BCA and is repeatedly recorded.

According to an aspect of the present invention, first two bits of the leading bytes of the tracking polarity information include identifiers of the respective tracking polarity information that is repeatedly recorded several times, and other six bits include remaining information of the tracking polarity information.

According to an aspect of the present invention, one of the six bits includes flag information that indicates whether other information is recorded in the BCA, and the other five bits of the six bits include the tracking polarity information that indicates a polarity of a tracking signal related to each recording layer of the optical disc.

According to another aspect of the present invention, there is provided an optical disc including a first recording layer in which a first lead-in area, a first data area, and a first lead-out area are formed; and a second recording layer in which a second lead-in area, a second data area, and a second lead-out area are formed, wherein at least one of the first and second recording layers includes a burst cutting area (BCA), in which information regarding the optical disc is recorded, and the information is read before performing tracking in the first and second data areas.

According to an aspect of the present invention, the information regarding the optical disc is at least one of tracking polarity information and reflectivity information, and the tracking polarity information and the reflectivity information are recorded with a pattern of crystalline or non-crystalline marks.

According to an aspect of the present invention, the recording of the tracking polarity information begins in leading bytes in the BCA and is repeatedly recorded.

According to yet another aspect of the present invention, there is provided a method of recording information on an optical disc that has at least one recording layer, the method including recording at least one of tracking polarity information and reflectivity information in a burst cutting area (BCA) of the recording layer.

According to still another aspect of the present invention, there is provided a method of reproducing information on an optical disc which has at least one recording layer, the method including reading tracking polarity information in a burst cutting area (BCA) of the recording layer, and analyzing the read tracking polarity information, outputting an analysis result indicative thereof, performing tracking in the recording layer of the optical disc using the analysis result, and recording or reproducing user data on the optical disc.

According to still another aspect of the present invention, there is provided a method of reproducing information on an optical disc which has at least one recording layer, the method including reading reflectivity information in a burst cutting area (BCA) of the recording layer; and analyzing the reflectivity information and outputting an analysis result indicative thereof, adjusting the write or read power of a laser beam using the analysis result, and recording or reproducing user data on the optical disc.

According to still another aspect of the present invention, there is provided an optical disc recording apparatus including a controller creating at least one of tracking polarity information and reflectivity information; and a recording unit recording the at least one of tracking information and reflectivity information created by the controller in a a burst cutting area (BCA) of an optical disc.

According to still another aspect of the present invention, there is provided an optical disc reproducing apparatus including a reading unit reading at least one of tracking polarity information and reflectivity information from a burst cutting area (BCA) of an optical disc, and a controller analyzing the information read by the reading unit and outputting an analysis result indicative thereof, and recording or reproducing user data on the optical disc using the analysis result.

According to an aspect of the present invention, there is provided an optical disc, comprising: a first recording layer formed on the optical disc; a second recording layer formed on the optical disc, wherein the first recording layer and a second recording layer each comprise a clamping area, a burst cutting area (BCA), a lead-in area, and a lead-out area, wherein the clamping area is an area that is pressurized to clamp the optical disc, and the BCA is an area in which tracking polarity information and/or reflectivity information is recorded; and a data area recording user data between the lead-in area and the lead-out area.

BRIEF DESCRIPTION OF THE DRAWINGS

The above and/other other aspects and advantages of the present invention will become more apparent by describing in detail aspects thereof with reference to the attached drawings in which.

DETAILED DESCRIPTION OF THE PREFERRED EMBODIMENTS

Reference will now be made in detail to the present aspects of the present invention, examples of which are illustrated in the accompanying drawings, wherein like reference numerals refer to the like elements throughout. The aspects are described below in order to explain the present invention by referring to the figures.

Figure 1:
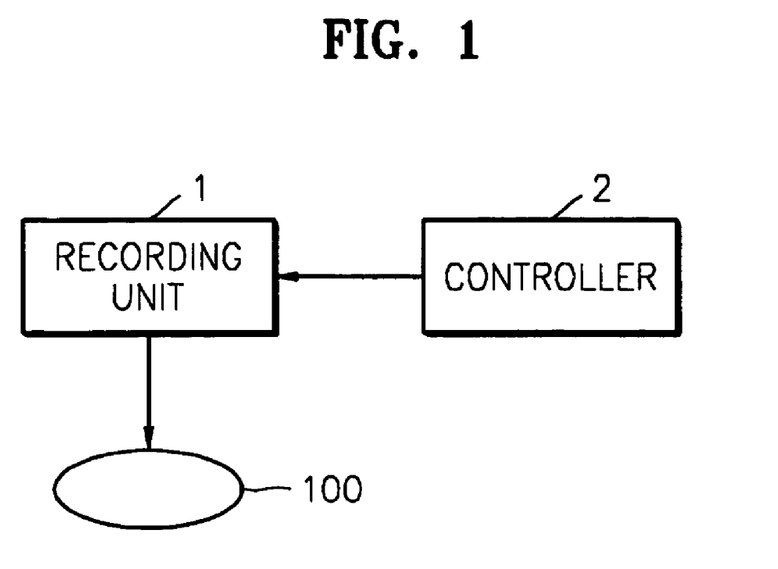
FIG. 1 is a schematic block diagram of an optical disc recording apparatus, according to an aspect of the present invention.

FIG. 1 is a schematic block diagram of an optical disc recording apparatus, according to an aspect of the present invention. Referring to FIG. 1, the recording apparatus includes a recording unit 1 and a controller 2 to record information regarding a polarity of a tracking signal and/or a reflectivity of an optical disc 100 on a burst cutting area (BCA) on the optical disc 100. The controller 2 creates the information regarding the polarity of the tracking signal and/or the reflectivity of the BCA and the recording unit 1 records at least one of tracking polarity information and reflectivity information on the BCA. Thus, the BCA of the optical disc 100, according to an aspect of the present invention, includes the tracking polarity information and/or the reflectivity information.

Figure 2:
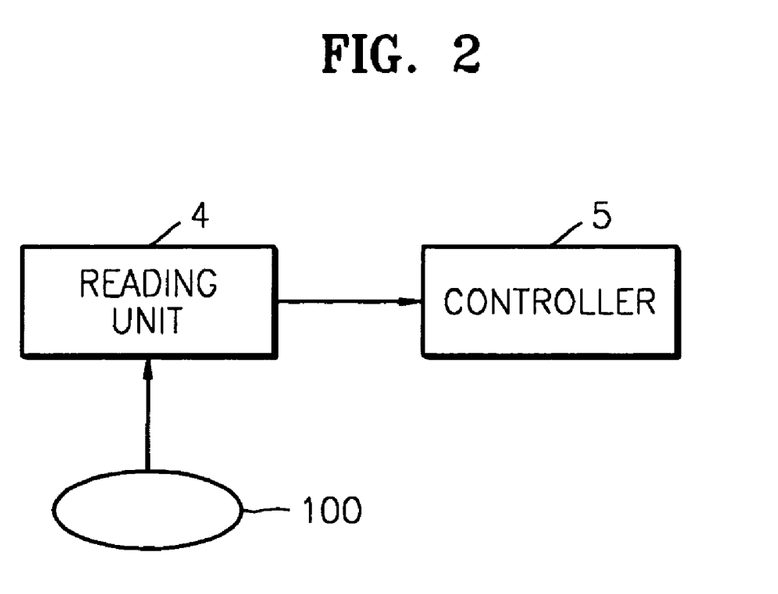
FIG. 2 is a schematic block diagram of an optical disc reproducing apparatus, according to an aspect of the present invention.

FIG. 2 is a schematic block diagram of an optical disc reproducing apparatus, according to an aspect of the present invention. Referring to FIG. 2, the reproducing apparatus includes a reading unit 4 and a controller 5. The reading unit 4 reads the tracking polarity information and/or the reflectivity information from the BCA on the optical disc 100, according to an aspect of the present invention, and provides an analysis result indicative thereof to the controller 5. Then, the controller 5 analyzes the tracking polarity information and/or the reflectivity information and reproduces user data from the optical disc 100 based on the analysis result.

The recording apparatus of FIG. 1 is an apparatus used in a mastering process by a disc manufacturer. The reproducing apparatus of FIG. 2 is an apparatus to reproduce the tracking polarity information and/or the reflectivity information, not the user data, from the BCA. Thus, the reproducing apparatus of FIG. 2 can be included in both the optical disc recording apparatus and the optical disc reproducing apparatus because the reproduction of the above information can be carried out when recording or reproducing the user data on the optical disc 100.

Figure 3:
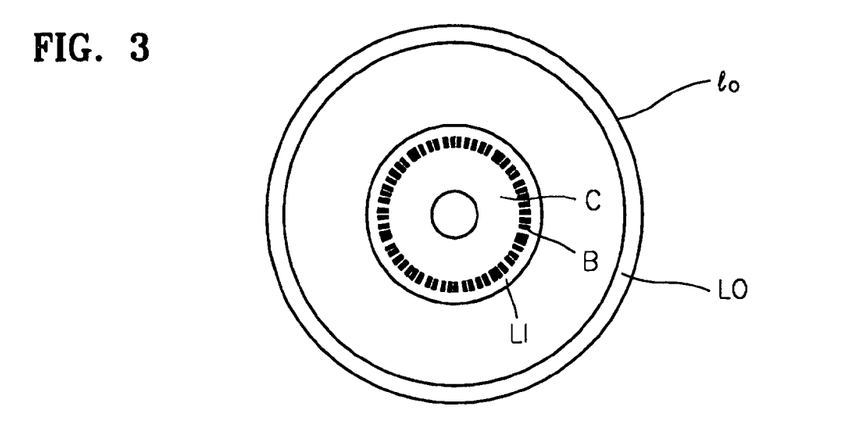
FIG. 3 is a schematic block diagram of an optical disc, according to an aspect of the present invention.

FIG. 3 is a schematic block diagram of the optical disc 100, according to an aspect of the present invention. Referring to FIG. 3, a first recording layer l 0 is formed on the optical disc 100. The first recording layer l 0 includes a clamping area C, the BCA B, a lead-in area LI, and a lead-out area LO. The clamping area C is an area that is pressurized by a clamping tool in order to clamp the optical disc 100. In general, the clamping area C is circular band shaped and formed in an inner portion of the optical disc 100. The BCA B is an area in which the tracking polarity information and/or the reflectivity information is recorded. The particulars of the optical disc 100, such as a corresponding serial number and manufacturing date, may be further recorded in the BCA B. A data area in which the user data is recorded, is present between the lead-in area LI and the lead-out area LO. If the first recording layer 1 0 is formed of a phase change material (PCM), the tracking polarity information and/or the reflectivity information may be recorded with a pattern of crystalline and/or non-crystalline marks. A method of recording information in the BCA B is disclosed in Korean Patent Application No. 2001-47957 entitled "Optical Disc and Methods for Recording and Reproducing Essential Information of Optical Disc," also filed by the present applicant.

Figure 4A:
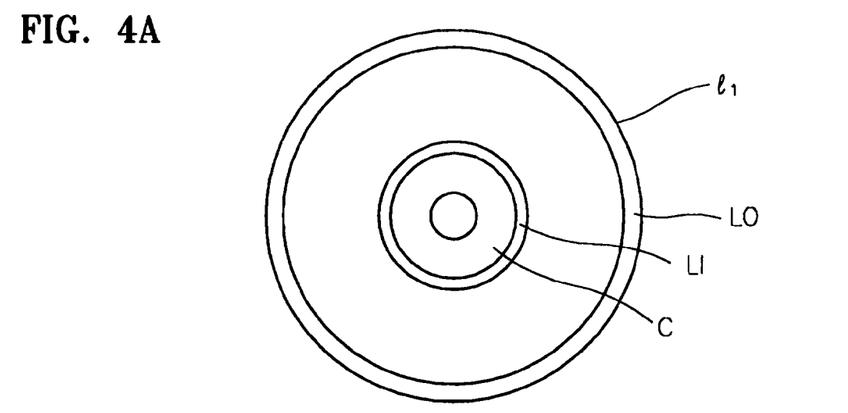
FIGS. 4A and 4B are schematic block diagrams of the optical disc, according to another aspect of the present invention.
Figure 4B:
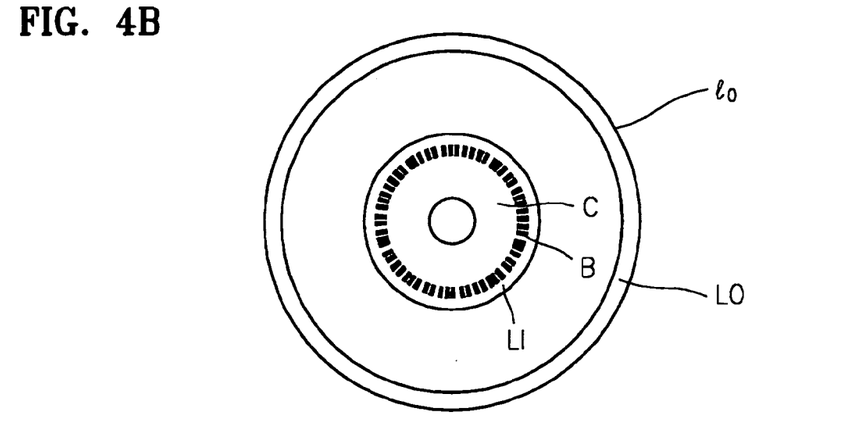

FIGS. 4A and 4B are schematic block diagrams of the optical disc 100, according to another aspect of the present invention. Referring to FIGS. 4A and 4B, the first recording layer 1 0 and a second recording layer 1 1 are formed on the optical disc 100. Each of the first recording layer 1 0 and the second recording layer 1 1 includes the clamping area C, the lead-in area LI, and the lead-out area LO. The data area in which the user data is recorded is present between the lead-in area LI and the lead-out area LO. The clamping area C, the lead-in area LI, and the lead-out area LO are the same as those explained with respect to FIG. 3, and therefore, their descriptions will not be repeated here. Further, the BCA B is present between the clamping area C and the lead-in area LI of the first recording layer 1 1. The tracking polarity information and/or the reflectivity information is recorded in the BCA B, according to an aspect of the present invention. The particulars of the optical disc 100, such as the corresponding serial number and the manufacturing date, may be further recorded in the BCA B. If the first recording layer 1 0 is formed of the phase change material (PCM), the tracking polarity information and/or the reflectivity information may be recorded with the pattern of the crystalline and/or the non-crystalline marks.

Figure 5A:
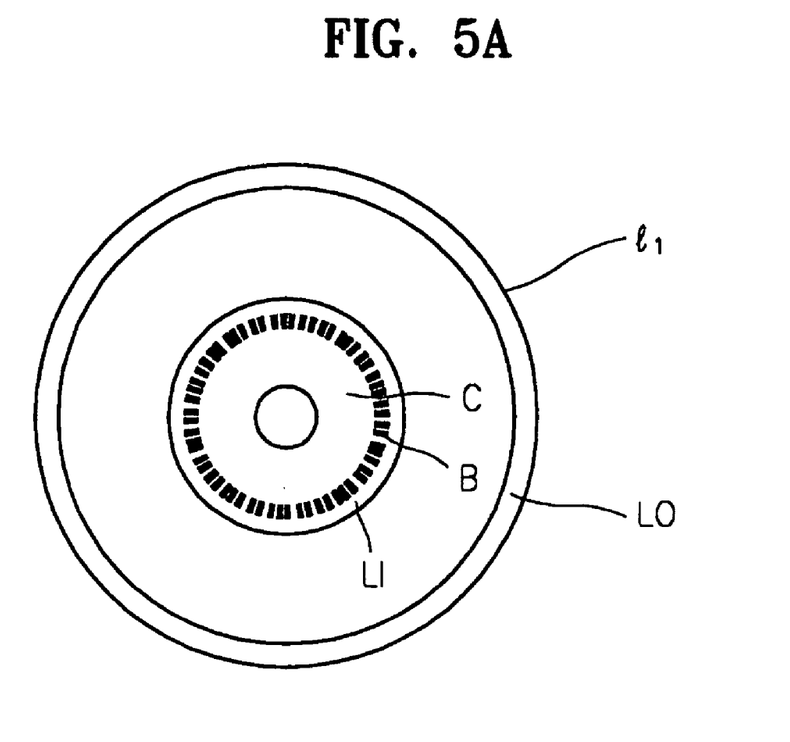
FIGS. 5A and 5B are schematic block diagrams of the optical disc according to still another aspect of the present invention.
Figure 5B:
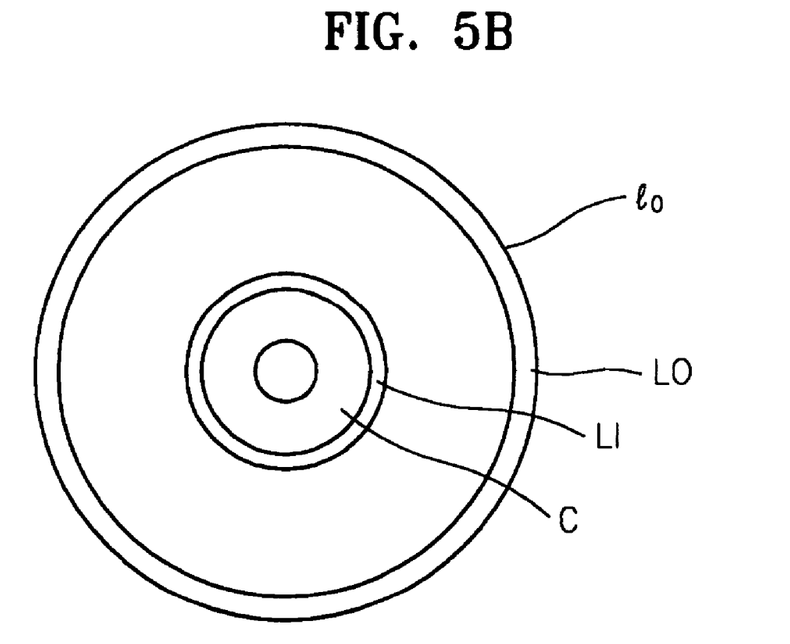

FIGS. 5A and 5B are schematic block diagrams of the optical disc 100, according to still another aspect of the present invention. Referring to FIGS. 5A and 5B, the first recording layer 1 0 and the second recording layer 1 1 are formed on the optical disc 100. Each of the first recording layer 1 0 and the second recording layer 1 1 includes a clamping area C, a lead-in area LI, and a lead-out area LO. The data area in which the user data is recorded is present between the lead-in area LI and the lead-out area LO. The clamping area C, the lead-in area LI, and the lead-out area LO are the same as those explained with respect to FIG. 3, and therefore, their descriptions will not be repeated here. According to an aspect of the present invention, the BCA B is formed on the second recording layer 1 1, unlike in FIGS. 4A and 4B in which the BCA B is present on the first recording layer 1 0. That is, the BCA B of FIGS. 5A and 5B is present between the clamping area C and the lead-in area LI of the second recording layer 1 1. If the second recording layer 1 1 is formed of the phase change material (PCM), the tracking polarity information or reflectivity information may be recorded with a pattern of crystalline and/or non-crystalline marks.

In conclusion, the optical disc 100 of FIGS. 5A and 5B is different from that of FIGS. 4A and 4B in that the BCA B is present in the second recording layer, not the first recording layer.

Figure 6A:
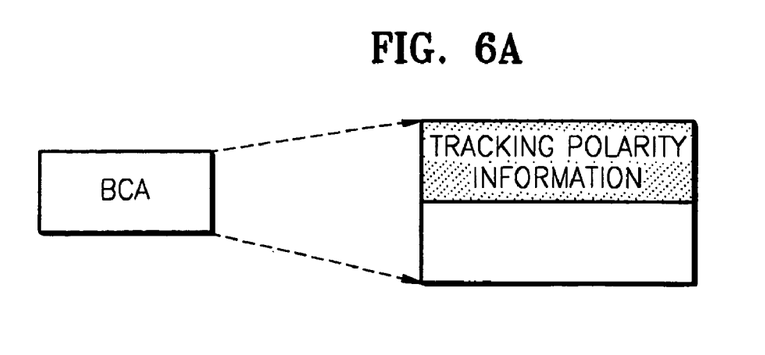
FIG. 6A illustrates a data structure of a burst cutting area (BCA) of the optical disc, according to an aspect of the present invention.

FIG. 6A illustrates a data structure of the BCA of the optical disc 100, according to an aspect of the present invention. Referring to FIG. 6A, the tracking polarity information is recorded in the BCA, according to an aspect of the present invention. The tracking polarity information provides the polarity of the tracking signal related to the optical disc 100. The tracking signal curves like an S-shape and corresponding right and left sides, which are divided with respect to the central point of the tracking signal, have opposite polarities. The polarity of the tracking signal changes according to a type of the optical disc 100, or physical characteristics of the recording layer such as the physical characteristics of a pit or a track. In other words, the polarities of the tracking signal change from (−) to (+) and (+) to (−) according to the type of the optical disc 100 or the physical characteristics of the recording layer. The particulars of the optical disc 100 may be further recorded in the BCA, as well as the tracking polarity information.

Figure 6B:
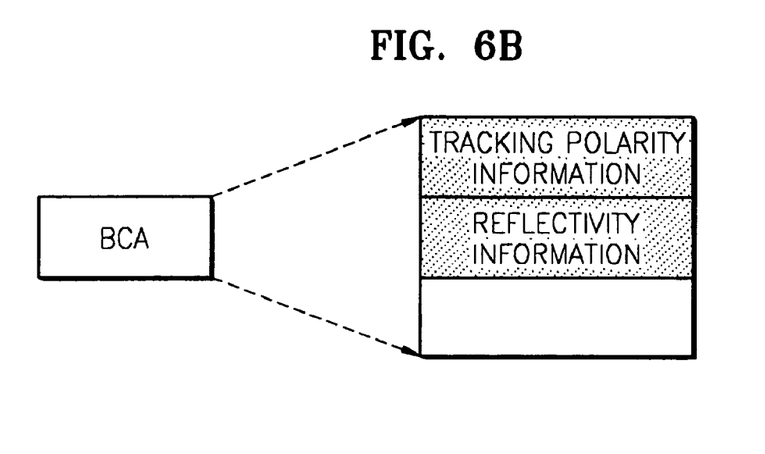
FIG. 6B illustrates the data structure of the BCA of the optical disc, according to another aspect of the present invention.

FIG. 6B illustrates a data structure of the BCA of the optical disc 100, according to another aspect of the present invention. The tracking polarity information and/or the reflectivity information is recorded in the BCA, according to an aspect the present invention. Here, the tracking polarity information is as described with reference to FIG. 6A. The reflectivity information provides the reflectivity of the optical disc 100, which is a ratio of the power of a laser beam reflected from the recording layer of the optical disc 100 to the power of the laser beam incident on the recording layer. The reflectivity also changes according to the type of the optical disc 100 or the physical characteristics of the recording layer.

Meanwhile, the tracking polarity information is recorded in both the BCAs of FIGS. 6A and 6B, but only the reflectivity information can be recorded if needed.

Figure 7:
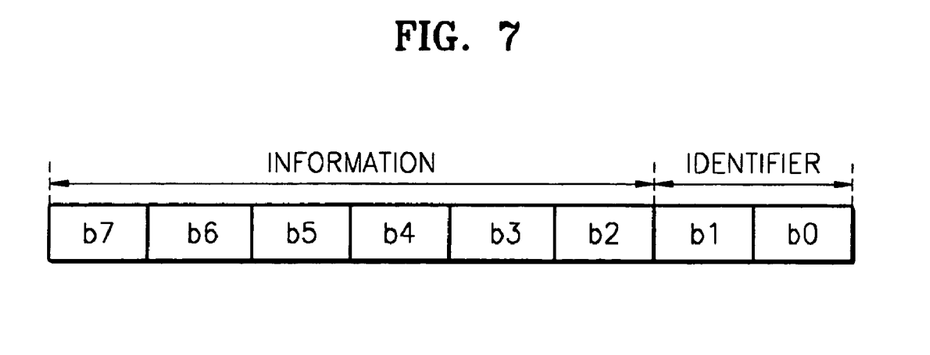
FIG. 7 illustrates the data structure of information recorded on the BCA of the optical disc, according to an aspect of the present invention.

FIG. 7 illustrates a data structure of the information recorded in the BCA of the optical disc 100, according to an aspect of the present invention. In detail, FIG. 7 shows an example of the BCA in the optical disc 100 having two recording layers as shown in FIGS. 4 and 5. The tracking polarity information is repeatedly recorded four times in the BCA and the recording begins at leading bytes of the BCA. First two bits b1b0 of the tracking polarity information are identifiers of the respective information that is repeatedly recorded. If the first two bits b1b0 are 00, the information indicates that first tracking polarity information is recorded in the BCA. If the first two bits b1b0 are 01, the information indicates that second tracking polarity information is recorded in the BCA. If the first two bits b1b0 are 10, the information indicates that third tracking polarity information is recorded in the BCA. If the first two bits b1b0 are 11, the information indicates that fourth tracking polarity information is recorded in the BCA. Repetitive recording of the information increases a robustness of the information. Even if an error occurs in one of the repeated recordings, it is possible to read desired information from the other recordings. The other six bits b7b6b5b4b3b2 provide the information. The bit b2 includes flag information indicating whether or not other information, i.e., the particulars of the optical disc 100, is recorded in the BCM. If the bit b2 is 0, the information indicates that the other information is not recorded in the BCM. If the bit b2 is 1, the information indicates that the other information is recorded in the BCM. The bits b7b6b5b4b3 represent the tracking polarity information and can be defined as follows:

00000: first recording layer=type A, second recording layer=type B
  00001: first recording layer=type B, second recording layer=type A
    00010: first recording layer=second recording layer=type A
    00011: first recording layer=second recording layer=type B For instance, when the other information is not recorded in the BCA, and the polarities of the tracking signals related to the first and second recording layers are type B and type A, respectively, the six bits b7b6b5b4b3b2 is expressed as '000010'. When the other information, such as the particulars of the optical disc 100, is recorded in the BCA and both polarities of the tracking signals related to the first and second recording layers are type A, the six bits b7b6b5b4b3b2 is expressed as '000101'.

If 1 byte is not enough to express the tracking polarity information, for example, if the number of recording layers is more than 2, it is possible to express the tracking polarity information using additional bits in addition to the 1 byte.

When the optical disc 100 is loaded into a disc drive of the optical disc reproducing apparatus, the disc drive easily accesses leading bytes of the BCA so as to read the tracking polarity information and/or the reflectivity information. Accordingly, the recording of the tracking polarity information and/or reflectivity information may begin on the leading bytes of the BCA.

A method of reproducing the data from the optical disc 100, according to an aspect of the present invention, will now be described. As mentioned above, the data that is reproduced using the method is not the user data, but the tracking polarity information and/or the reflectivity information recorded in a BCA of the optical disc 100. The reproduction of such data can be performed both when recording and reproducing the user data in a data area.

Figure 8:
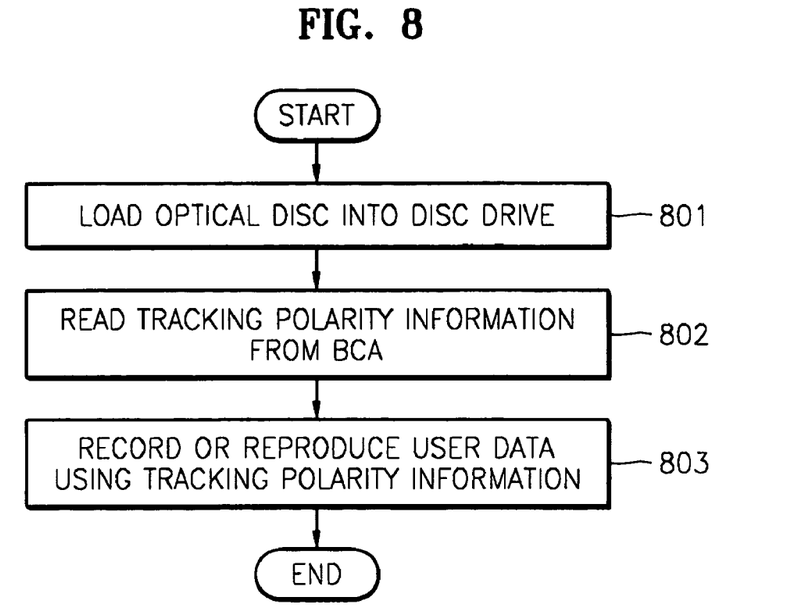
FIG. 8 is a flowchart illustrating a method of reproducing data from the optical disc, according to an aspect of the present invention.

FIG. 8 is a flowchart illustrating the method of reproducing the data from the optical disc 100, according to an aspect of the present invention. Referring to FIG. 8, at operation 801, when the optical disc 100 is loaded into the disc drive of the reproducing apparatus of FIG. 2, at operation 802 the optical pickup included in the disc drive reads the tracking polarity information from the BCA of the optical disc 100. At operation 803, the reproducing apparatus (or the disc drive) performs the tracking on the optical disc 100 using the read tracking polarity information without trial and error, and records or reproduces the user data in a data area of the optical disc 100. In other words, the optical pickup provides the tracking polarity information to the disc drive, and then, the disc drive controls the optical pickup using the information to perform the recording or the reproducing of the user data on the optical disc 100.

Figure 9:
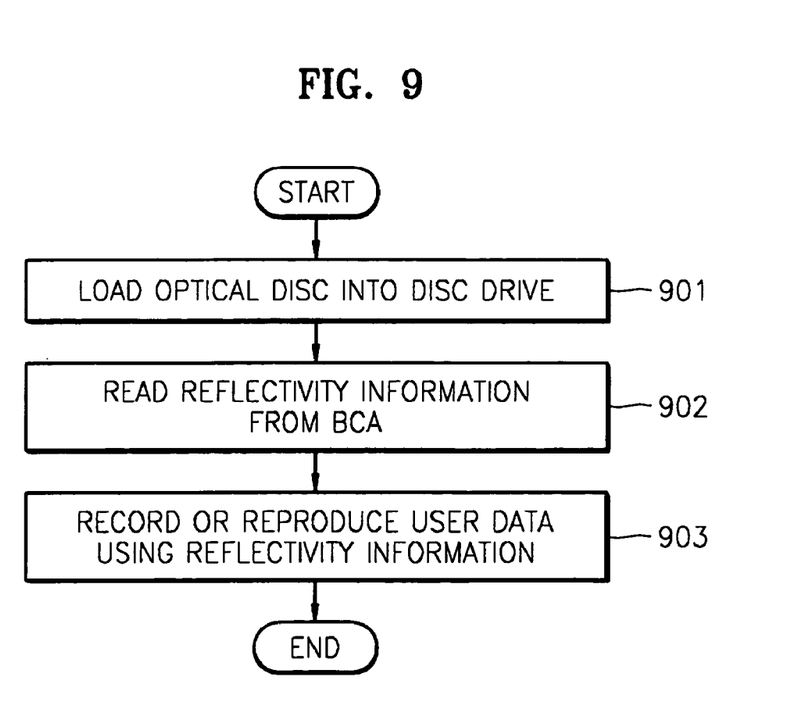
FIG. 9 is a flowchart illustrating the method of reproducing data from the optical disc, according to another aspect of the present invention.

FIG. 9 is a flowchart illustrating the method of reproducing the data from the optical disc 100, according to another aspect of the present invention. Referring FIG. 9, at operation 901, when the optical disc 100 is loaded into the disc drive of the reproducing apparatus of FIG. 2, at operation 902, the optical pickup included in the disc drive reads reflectivity information from the BCA of the optical disc 100. At operation 903, the reproducing apparatus (or the disc drive) adjusts the write/read power of the laser beam using the read reflectivity information without trial and error, and records or reproduces the user data in the data area of the optical disc 100. In other words, the optical pickup provides the reflectivity information to the disc drive, and then, the disc drive controls the optical pickup using the information to perform the recording or the reproducing of the user data on the optical disc 100.

As described above, tracking polarity information and/or reflectivity information is recorded in a BCA of an optical disc according to an aspect of the present invention. Accordingly, it is possible to obtain the tracking polarity information and/or reflectivity information without trial and error and directly record or reproduce user data in a data area of the optical disc.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. An optical disc, comprising:
    a clamping area;
    a lead-in area;
    a data area; and
    a burst cutting area (BCA) between the clamping area and the lead-in area and in which information regarding the optical disc is recorded, wherein the information is read before performing tracking in the data area,
    wherein the information regarding the optical disc comprises tracking polarity information.

2. The optical disc as recited in claim 1, wherein the information regarding the optical disc further comprises reflectivity information.

3. The optical disc as recited in claim 2, wherein the tracking polarity information and the reflectivity information are recorded with a pattern of crystalline or non-crystalline marks.

4. The optical disc as recited in claim 2, wherein the recording of the tracking polarity information begins at leading bytes in the BCA.

5. The optical disc as recited in claim 4, wherein the tracking polarity information is repeatedly recorded.

6. The optical disc as recited in claim 4, wherein a first two bits of the leading bytes of the tracking polarity information comprise identifiers of the respective tracking polarity information that is repeatedly recorded several times, and six other bits comprise remaining information of the tracking polarity information.

7. The optical disc as recited in claim 6, wherein one of the six other bits comprise flag information that indicates whether other information is recorded in the BCA.

8. The optical disc as recited in claim 7, further comprising a recording layer, wherein the other five bits of the six bits comprise the tracking polarity information that indicates a polarity of a tracking signal related to the recording layer of the optical disc.

9. The optical disc as recited in claim 1, further comprising a recording layer, wherein the clamping area, the lead-in area, and the data area are formed in the recording layer of the optical disc.

10. The optical disc as recited in claim 6, wherein the first two bits comprise first two bits b1b0 of the tracking polarity information which are identifiers of information that is repeatedly recorded, where if the first two bits b1b0 are 00, the information indicates that first tracking polarity information is recorded in the BCA, if the first two bits b1b0 are 01, the information indicates that second tracking polarity information is recorded in the BCA, if the first two bits b1b0 are 10, the information indicates that third tracking polarity information is recorded in the BCA, or if the first two bits b1b0 are 11, the information indicates that fourth tracking polarity information is recorded in the BCA.

11. An apparatus for processing data recorded in an information storage medium comprising a burst cutting area between a clamping area and a lead-in area, the apparatus comprising:
    an optical pickup arranged to emit a light to the information storage medium to transfer data with respect to the information storage medium; and
    a controller arranged to control the optical pickup to reproduce information regarding the information storage medium from the burst cutting area,
    wherein the information regarding the information storage medium comprises traking polarity information.

* * * * *